O. L. FOGLEMAN.
CHUCK.
APPLICATION FILED JULY 28, 1911.
1,028,562.
Patented June 4, 1912.
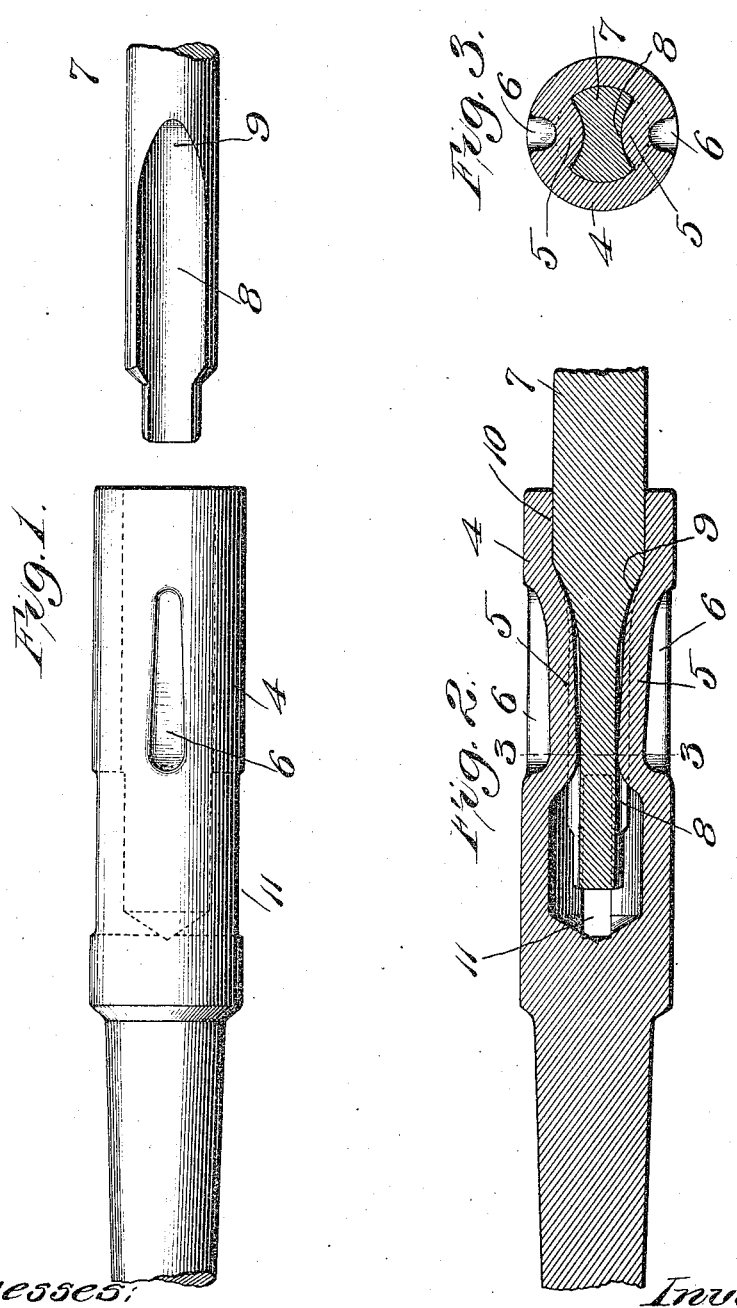

UNITED STATES PATENT OFFICE.

OSCAR L. FOGLEMAN, OF ST. LOUIS, MISSOURI.

CHUCK.

1,028,562.  Specification of Letters Patent.  Patented June 4, 1912.

Application filed July 28, 1911. Serial No. 641,028.

*To all whom it may concern:*

Be it known that I, OSCAR L. FOGLEMAN, a citizen of the United States, residing in the city of St. Louis and State of Missouri, have invented new and useful Improvements in Chucks, of which the following is a specification.

This invention relates to certain new and useful improvements in chucks, and has for its object to provide a unitary device which will readily receive and firmly hold the tool inserted therein without the use of clamping devices or other movable parts of any description.

By constructing a chuck according to my invention the same may be far more economically manufactured than can chucks such as are now used having movable portions for clamping the shank of the tool, and the insertion and clamping of the tool in the chuck can be more rapidly performed.

The invention is illustrated in the accompanying drawing, in which—

Figure 1 is a view in side elevation showing a chuck constructed according to my invention with the shank of a tool in readiness to be inserted therein; Fig. 2 is a longitudinal sectional view through a chuck and the shank of a tool, the latter being inserted in the chuck; and Fig. 3 is a cross section on the line 3—3 of Fig. 2.

Referring now to the drawing, the numeral 4 indicates a chuck which, according to my invention, is provided on its interior on diametrically opposite sides with longitudinally-extending projections 5. As shown in the drawing, these projections are made by pressing or indenting the metal of the chuck on opposite sides, as indicated at 6, but it is within the purview of my invention to form the projections 5 on the inside of the chuck by casting the chucks, and forming the projections at the time of casting.

7 indicates the shank of a tool, such as a reamer, drill, or the like, said shank being of the standard construction, and being provided on opposite sides at its rear end with longitudinally-extending grooves 8, which, at their inner end, are formed with an inclined portion 9 at the termination of the groove. These inclined portions 9 on the opposite sides of the shank are adapted, when the shank is inserted in the opening 10 of the chuck, to frictionally engage the projections 5, and thereby cause the shank to become wedged in the chuck.

The operation is very simple, it only being necessary to insert the shank 7 in the opening 10 and then force or drive the same to cause the inclined surfaces 9 to engage the projections 5 firmly. These projections 5 not only serve to hold the tool in the chucks by wedging action with the surfaces 9, but they likewise prevent the tool from turning in the chuck. As shown in the drawing, the indentations 6 are made somewhat deeper at the rear than toward the front end, thereby causing the projections to come closer together at said rear end, this construction affording a tapering opening and facilitating the ready entrance of the butt-end of the shank into the recess in the chuck.

The numeral 11 indicates the usual opening for the insertion of a drift with which to knock the tool out of the chuck.

I claim:

1. In combination with a tool having a shank provided with a groove in opposite sides, each having an inclined portion at its inner end, a chuck having an opening for the reception of said shank and provided on opposite sides of its interior at points removed from its outer end with projections adapted to fit in said grooves, and to provide a wedging connection with said inclined portions of the shank.

2. In combination with a tool having a shank provided with a groove in opposite sides, each having an inclined portion at its inner end, a chuck having an opening for the reception of said shank and provided on opposite sides of its interior, at points removed from its outer end, with inclined projections adapted to fit in said grooves and to provide a wedging connection with said inclined portions thereof.

3. In combination with a tool having a shank provided with grooves in opposite sides, each having an inclined portion at its inner end, a chuck having an opening for the reception of said shank and being indented on opposite sides, at points removed from its outer end, to provide projections on the interior of the chuck, said projections being adapted to fit in said grooves, and having inclined forward ends adapted to provide a wedging connection with said inclined portions of the grooves.

In testimony whereof, I have hereunto set my hand in presence of two subscribing witnesses.

OSCAR L. FOGLEMAN.

Witnesses:
W. C. REEL,
BRUCE S. ELLIOTT.